United States Patent
Watanabe et al.

(10) Patent No.: US 8,529,777 B2
(45) Date of Patent: Sep. 10, 2013

(54) METHOD OF MAKING A MASK, METHOD OF PATTERNING BY USING THIS MASK AND METHOD OF MANUFACTURING A MICRO-DEVICE

(75) Inventors: Hisayoshi Watanabe, Tokyo (JP); Hideyuki Yatsu, Tokyo (JP); Takayuki Nishizawa, Tokyo (JP); Masashi Sano, Tokyo (JP); Hiromichi Umehara, Tokyo (JP); Takayasu Kanaya, Tokyo (JP); Tetsuji Hori, Tokyo (JP)

(73) Assignee: TDK Corporation, Tokyo (JP)

( * ) Notice: Subject to any disclaimer, the term of this patent is extended or adjusted under 35 U.S.C. 154(b) by 126 days.

(21) Appl. No.: 13/230,261

(22) Filed: Sep. 12, 2011

(65) Prior Publication Data

US 2013/0062307 A1 Mar. 14, 2013

(51) Int. Cl.
*B44C 1/22* (2006.01)
*C03C 15/00* (2006.01)
*C03C 25/68* (2006.01)
*C23F 1/00* (2006.01)

(52) U.S. Cl.
USPC .................................................. 216/41

(58) Field of Classification Search
USPC ............................................ 216/41, 22
See application file for complete search history.

(56) References Cited

U.S. PATENT DOCUMENTS

| 6,916,597 | B2 | 7/2005 | Kamijima et al. | |
| 2009/0061641 | A1* | 3/2009 | Jung | 438/740 |
| 2010/0291490 | A1* | 11/2010 | Tsuruda et al. | 430/325 |

FOREIGN PATENT DOCUMENTS

JP  A-2002-116557  4/2002

\* cited by examiner

*Primary Examiner* — Roberts Culbert
(74) *Attorney, Agent, or Firm* — Posz Law Group, PLC

(57) ABSTRACT

The present invention relates to a method of making a mask for patterning a thin film. The method includes a step of forming an inorganic material, which is resolvable into alkali solution, on a substrate; a step of forming the inorganic material in a predetermined pattern; and a step of narrowing the inorganic material with the alkali solution to form the mask.

24 Claims, 13 Drawing Sheets

METHOD OF MAKING A MASK, METHOD OF PATTERNING BY USING THIS MASK AND METHOD OF MANUFACTURING A MICRO-DEVICE

BACKGROUND OF THE INVENTION

1. Field of the Invention

The present invention relates to a method of making a mask for patterning a thin film on a substrate, a method of patterning the thin film using the mask, and a method of manufacturing a micro device, which is, for example, a thin film magnetic head, using the methods.

2. Description of the Related Art

For example, micro devices such as thin film magnetic heads or the like which are used for magnetic recording devices are manufactured by patterning a thin film formed on a substrate in a predetermined shape. Specifically, each film is formed using film formation technology such as a plating method, a sputtering method, or the like, patterning technology such as a photolithography method, and removal technology such as etching, a chemical mechanical polishing method, or the like.

For patterning the thin film formed on the substrate, for example, the photolithography method is used. Specifically, a thin film is first coated on a substrate, and a photoresist is coated on the thin film. Then, using a photo mask with a predetermined aperture pattern, the photoresist is exposed in a predetermined pattern. Then, by developing the photoresist, the photoresist in the predetermined pattern is formed on the thin film. Then, by removing a portion of the thin film that is not covered by the photoresist by etching or the like, the thin film can be patterned in the predetermined shape.

In micro devices such as the above-described thin film magnetic heads, there is a demand that a thin film formed on a substrate should be patterned extremely small.

However, in the patterning using the photolithography method, there is a lower limit on the size of narrowing a thin film to be patterned. In other words, due to an optical theoretical limit that is a diffraction limit, there is a limit of narrowing an exposure pattern to the photoresist. Accordingly, only a photoresist pattern with relatively wide width can be formed so that there is a limit of narrowing the thin film that is patterned.

JP Laid-Open Patent Publication No. 2002-116557 discloses a method for manufacturing a resist pattern having even narrower pattern, and a method for narrowing a thin film pattern. Specifically, a milled thin film is formed on a substrate. Then, a polymethylglutarimide (PMGI) layer is coated on the milled thin film. Next, a photoresist layer is coated on the PMGI layer. Then, the photoresist layer is exposed by, for example, ultraviolet (UV) through a mask with a predetermined pattern. Next, a developing treatment to the photoresist layer is performed as well as the PMGI layer exposed from the photoresist layer is removed by alkali solution or the like so that a pre-resist pattern is obtained. Then, an ashing treatment is performed on the pre-resist pattern so that the pre-resist pattern is narrowed.

As described above, by performing the ashing treatment on the pre-resist pattern formed by the photolithography method, a resist pattern that is narrower than the optical theoretical limit can be obtained. By patterning the milled thin film using this resist pattern, even narrower patterning can be performed. Also, a lower portion of the pre-resist pattern, which is the PMGI layer, becomes relatively small by the ashing so that a T-shaped pre-resist pattern is formed.

In Japan Laid-Open Patent Publication No. 2002-116557, a pre-resist pattern is narrowed by an ashing treatment to form a mask, so that the pre-resist pattern is made of an organic material such as PMGI. However, the strength of the organic material is relatively low, and the narrowed mask is more likely to be unstable. As a result, the mask may incline or even fall down. Specially, when making a T-shaped pre-resist pattern, a narrowed mask becomes more unstable.

Normally, it is common that a large number of micro devices are made on a wafer in one time. In the ashing treatment, the degree of narrowing the organic material of the pre-resist pattern by the ashing is more likely to change between a central portion and an outer circumference portion of the wafer. As a result, variation in width of the mask of the narrowed pre-resist pattern occurs, and variations in width and shape of the thin film patterned using this mask may occur.

Therefore, a method of making a mask for further stably patterning a thin film, and a method of patterning using a mask thereof are desired. Such methods can be preferably used for manufacturing micro devices such as thin film magnetic heads.

SUMMARY OF THE INVENTION

The present invention relates to a method of making a mask for patterning a thin film. The method includes a step of forming an inorganic material, which is resolvable into alkali solution, on a substrate; a step of forming the inorganic material in a predetermined pattern; and a step of narrowing the inorganic material with the alkali solution to form the mask. The step of forming the inorganic material in a predetermined pattern may be, for example, a photolithograph method.

The pattering method of the thin film of the present invention includes a step of forming a mask including an inorganic material that is resolvable into alkali solution on the substrate on which a first thin film was formed with the above method of making the mask, and a step of removing a portion that is not covered by the mask of the first thin film to pattern the first thin film.

Also, the present invention includes a method of manufacturing a micro device including a step of patterning a thin film in a predetermined shape using the above-described method. The micro device may be, as one example, a thin film magnetic head.

In the above-described method, it is possible to narrow an inorganic material in a predetermined pattern, the material being formed by a method including, for example, a photolithography method, with alkali solution to use as a mask for patterning the first thin film. An inorganic material normally has a higher strength than an organic material, so there is an advantage that stability of the inorganic material that has been used as a mask after being narrowed is high. As a result, it can prevent the mask from leaning or toppling.

Also, because the inorganic material is narrowed by alkali solution but not by ashing using gas, it is possible to suppress that the width and the shape of a patterned thin film varies between a central portion of the wafer and an outer circumference of the wafer even when a large number of the first thin films on the wafer are patterned at one time.

The above description, as well as other objects, features, and advantages of the present invention will be evident by the description that follows below with reference to attached drawings exemplifying the present invention.

BRIEF DESCRIPTION OF THE DRAWINGS

FIGS. 5A, 5B, and 5C-FIGS. 13A, 13B, and 13C are process drawings for describing the method of making the mask according to the first embodiment of the present invention;

FIGS. 17A, 17B, and 17C-FIGS. 20A, 20B, and 20C are process drawings for describing the removal method of the mask;

FIGS. 21A, 21B, and 21C-FIGS. 24A, 24B, and 24C are process drawings for describing a method of making a mask according to a second embodiment;

FIGS. 25A, 25B, and 25C-FIGS. 26A, 26B, and 26C are process drawings illustrating a removal method of the mask made by the method according to the second embodiment;

DETAILED DESCRIPTION OF THE INVENTION

Hereinafter, regarding a method of making a mask for patterning a thin film, a method of patterning the thin film, and a method of manufacturing a micro device, description is given using manufacture of a magneto resistive effect (MR) element or the like used for a thin film magnetic head as an example. The present invention can be applied to manufacture of not only the thin film magnetic head but also an arbitrary micro device.

Figure 1:
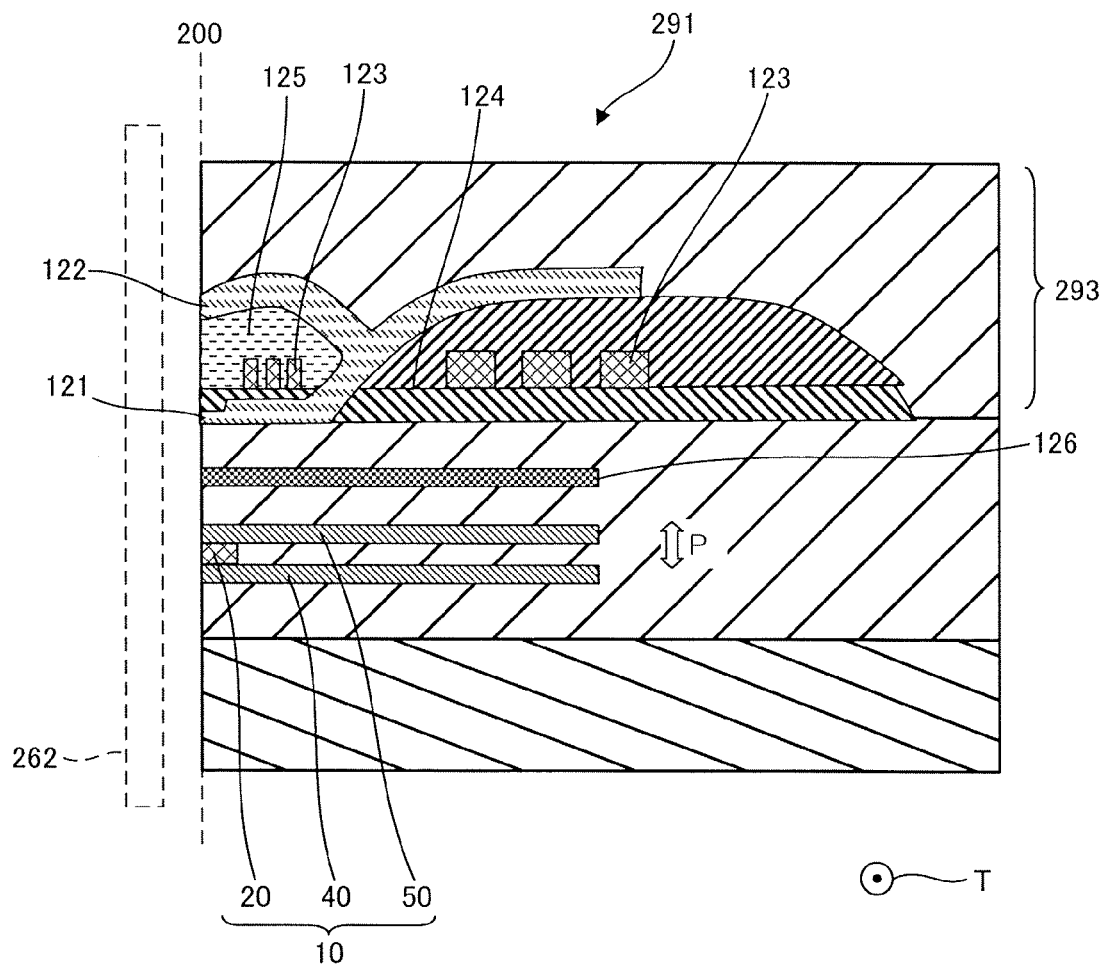
FIG. 1 is a schematic cross-sectional view of a magnetic head including a MR element.

Initially, description is given regarding one example of a configuration of a thin film magnetic head including a MR element manufactured using the methods of the present invention. FIG. 1 is a schematic cross-sectional view of a thin film magnetic head 291 along a plane orthogonal to an air bearing surface 200. Herein, the air bearing surface 200 is one surface of the thin film magnetic head 291 that opposes a recording medium 262 when a signal of the recording medium 262 is read.

The thin film magnetic head 291 includes a writing element 293 that writes magnetic information to the recording medium 262 and a reading element 10 that reads the magnetic information that has been written to the recording medium 262. As substitute for this, the thin film magnetic head 291 may include only the reading element 10.

Figure 2:
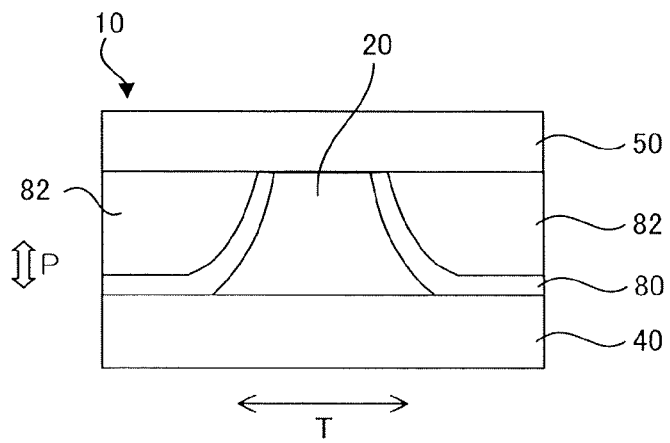
FIG. 2 is a schematic plan view of the MR element from a perspective of an air bearing surface.

FIG. 2 illustrates one surface of the reading element 10 from a perspective of the air bearing surface 200. The reading element 10 includes a magneto resistive effect element 20 and lower and upper shield layers 40 and 50 that are disposed so as to sandwich the MR element 20 in a film surface orthogonal direction P of the MR element 20.

On both sides of the MR element 20 in the track width direction T, magnetic layers 82 that apply a bias magnetic field to the MR element 20 is disposed. Herein, the track width direction T is a direction orthogonal to a direction in which recording tracks of the recording medium 262 extend when the MR element 20 faces the recording medium 262 (see FIG. 2). Insulating layers 80 are disposed between the magnetic layers 82 and the lower shield layer 40 and between the magnetic layers 82 and the MR element 20.

As the MR element 20, there are a current-in-plane (CIP) element where a sense current flows in a direction parallel to a film surface of the element and a current-perpendicular-to-the-plane (CPP) elements where a sense current flows in a direction P orthogonal to a film surface of the element. As one example, the CPP element is formed of a stack including a magnetic layer (free layer) of which a magnetization direction changes according to an external magnetic field, a magnetic layer (pinned layer) of which a magnetization direction is pinned, and a nonmagnetic intermediate layer that is sandwiched between the pinned layer and the free layer. Also, the stack is provided with an antiferromagnetic layer (pinning layer) so as to pin the magnetization direction of the pinned layer. The magnetization direction of the free layer changes according to the external magnetic field so that a relative angle that the magnetization direction of the free layer forms with the magnetization direction of the pinned layer changes. As a result, electrical resistance of the MR element 20 changes. Using this property, the MR element 20 can detect the external magnetic field. Not limited to this example, any configuration can be applied to the MR element 20 as long as the MR element 20 is an element that shows the magneto resistive effect.

Next, detail description regarding a configuration of the writing element 293 is given with reference to FIG. 1. The writing element 293 is disposed above the reading element 10 with an interelement shield 126 therebetween, and the interelement shield 126 is formed by a sputtering method or the like. The writing element 293 has a configuration for a so-called perpendicular magnetic recording. A pole layer for writing is formed with a main pole layer 121 and an auxiliary pole layer 122. These pole layers 121 and 122 are formed by a frame plating method or the like. The main pole layer 121 is formed of, for example, FeCo, and is exposed toward a direction nearly orthogonal to the air bearing surface 200 on the air bearing surface 200. A coil layer 123 extending over a gap layer 124 formed of an insulating material is wound around the periphery of the main pole layer 121 so that a magnetic flux is induced to the main pole layer 121 by the coil layer 123. The coil layer 123 is formed by a frame plating method or the like. The magnetic flux is guided within the main pole layer 121 and is extended from the air bearing surface 200 towards the recording medium 262. The main pole layer 121 is tapered not only in the film surface orthogonal direction P but also in the track width direction T (orthogonal direction to a sheet surface in FIG. 1) near the air bearing surface 200 to generate a minute and strong writing magnetic field that is applicable to the high recording density.

The auxiliary pole layer 122 is a magnetic layer that is magnetically coupled with the main pole layer 121. The auxiliary pole layer 122 is disposed in a manner of branching from the main pole layer 121 and opposes the main pole layer 121 with the gap layer 124 and a coil insulating layer 125 therebetween on the air bearing surface 200 side. An end part of the auxiliary pole layer 122 on the air bearing surface 200 side forms a trailing shield part in which a layer cross-section is wider than other parts of the auxiliary pole layer 122. A magnetic field gradient between the auxiliary pole layer 122 and the main pole layer 121 becomes even steeper in the vicinity of the air bearing surface 200 by providing this type of auxiliary pole layer 122.

Hereinafter, regarding preferred first embodiment of a method of making a mask of the present invention, a method of patterning the thin film, and a method of manufacturing a micro device, description is given using a method of manufacturing a MR element or the like used for the above-described thin film magnetic head as an example. In the present embodiment, it is preferred to form the MR element 20 on a wafer (see also FIG. 28) which manufactures a large number of the MR elements at one time.

Figure 3:
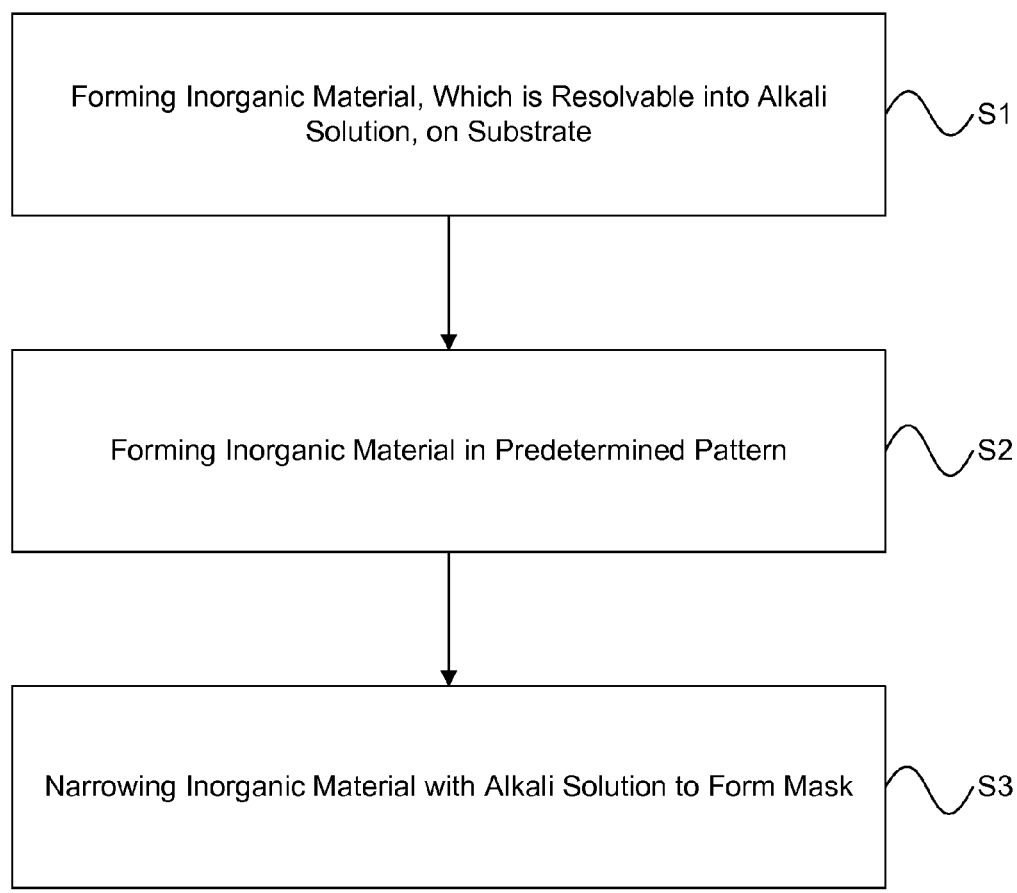
FIG. 3 is a flow diagram of a method of making a mask according to a first embodiment.
Figure 14A:
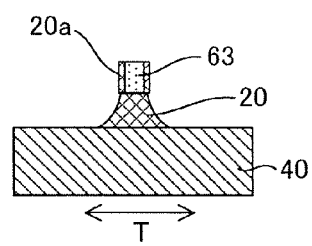
FIGS. 14A, 14B, and 14C and FIGS. 15A, 15B, and 15C are process drawings for describing a method of patterning a thin film using the mask illustrated in FIGS. 13A, 13B, and 13C.
Figure 14B:
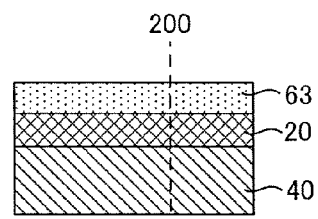
Figure 14C:
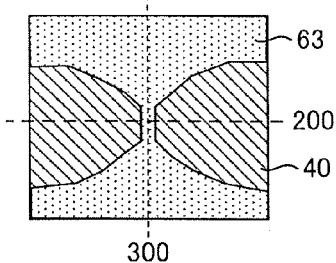
Figure 15A:
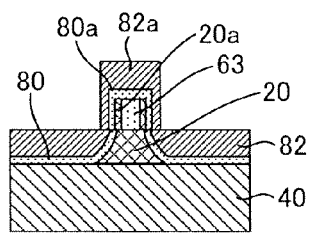
Figure 15B:
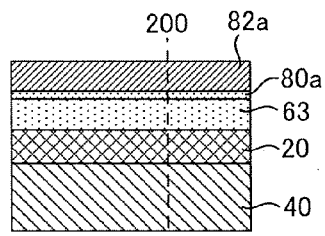
Figure 15C:
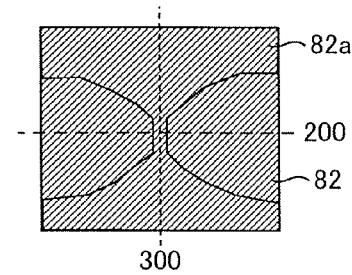
Figure 16:
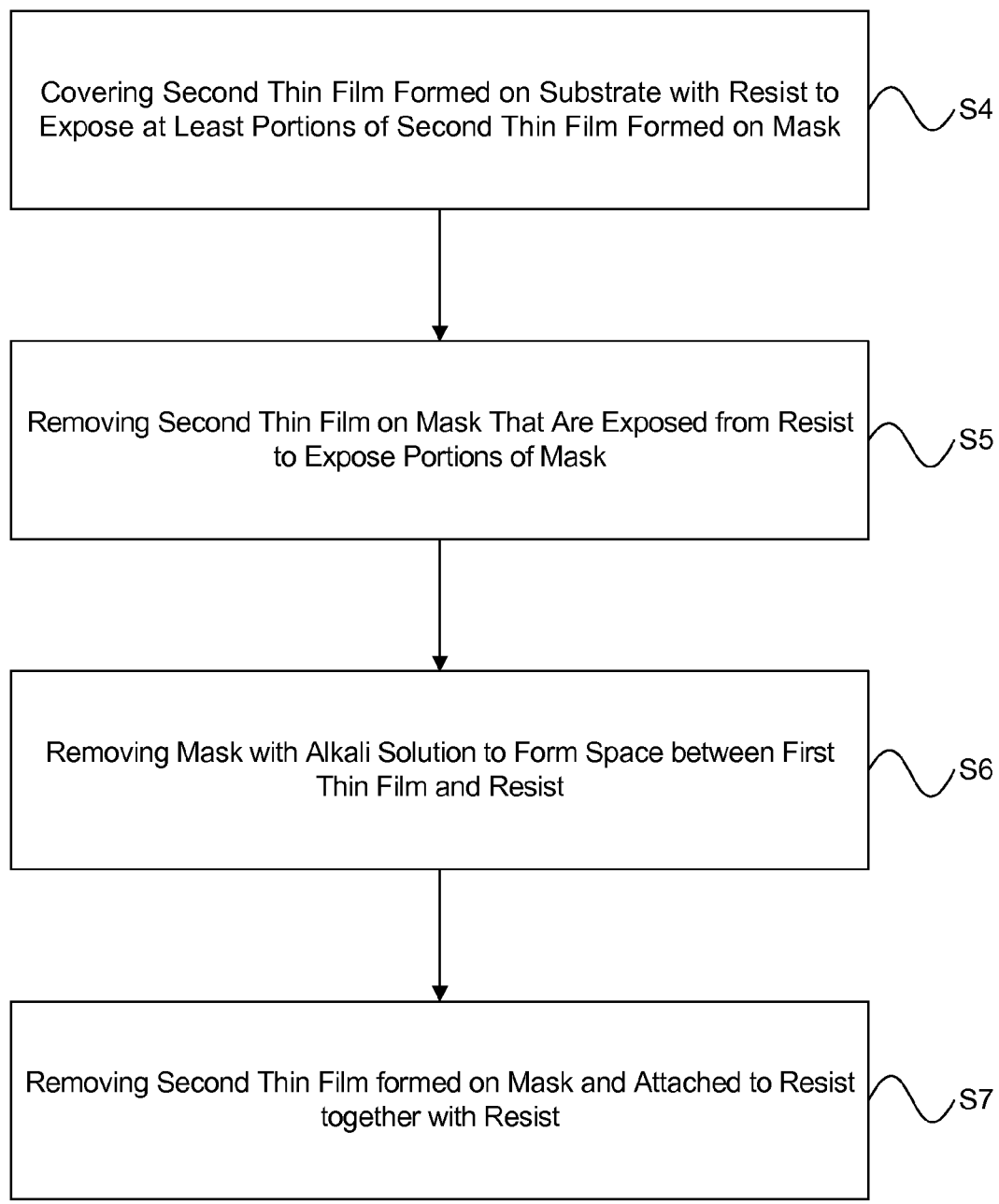
FIG. 16 is a flow diagram of a removal method of the mask illustrated in FIGS. 15A, 15B, and 15C.

FIGS. 5A, 5B, and 5C-FIGS. 15A, 15B, and 15C, and FIGS. 17A, 17B, and 17C-FIGS. 20A, 20B, and 20C illustrate a series of steps of patterning a thin film for forming a MR element or the like in a micro device such as a thin film magnetic head or the like. Out of these figures, FIGS. 5A, 5B, and 5C-FIGS. 13A, 13B, and 13C illustrate the method of making a mask according to the first embodiment, and FIG. 3 illustrates a flow diagram of the method of making the mask. Also, FIGS. 14A, 14B, and 14C and FIGS. 15A, 15B, and 15C illustrate a method of patterning a thin film using the mask. FIGS. 17A, 17B, and 17C-FIGS. 20A, 20B, and 20C illustrate a removal method of the mask, and FIG. 16 illustrates a flow diagram of the removal method of the mask.

Figure 5A:
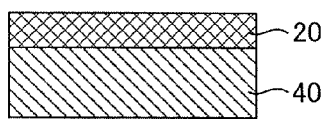
Figure 5B:
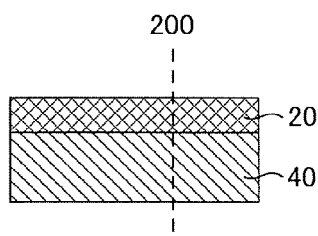
Figure 5C:
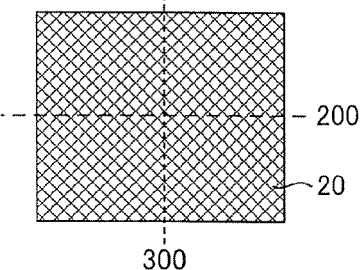
Figure 6A:
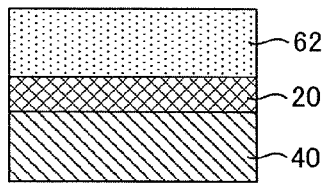
Figure 6B:
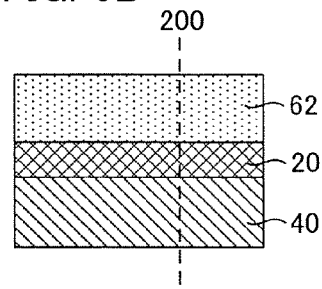
Figure 6C:
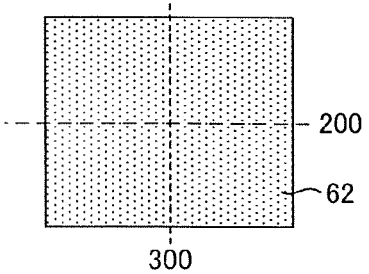
Figure 17A:
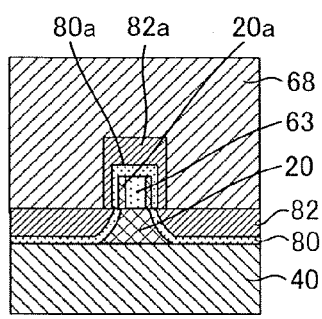
Figure 17B:
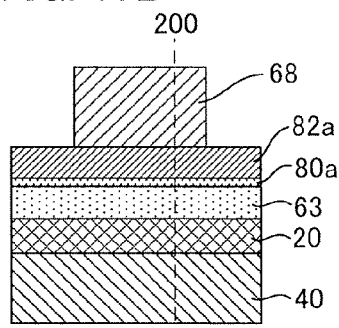
Figure 17C:
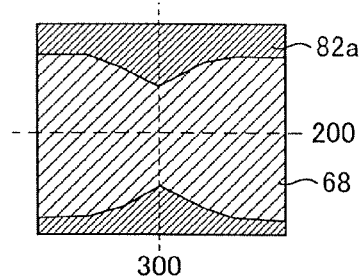
Figure 18A:
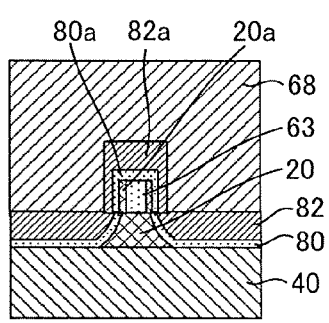
Figure 20A:
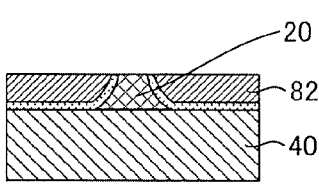
Figure 20B:
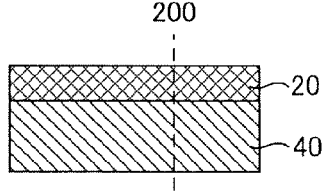
Figure 20C:
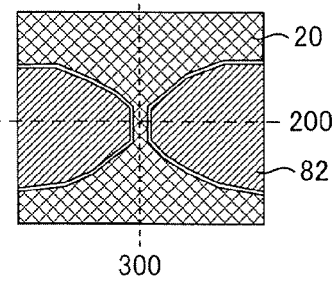

Note, FIG. 5A, FIG. 6A . . . FIG. 15A, FIG. 17A, FIG. 18A . . . FIG. 20A are cross-sectional views of micro devices; for example, cross-sectional views of wafers along a plane of the thin film magnetic head 291 that is to be the air bearing surface 200. FIG. 5B, FIG. 6B . . . FIG. 15B, FIG. 17B, FIG. 18R . . . FIG. 20B are cross-sectional views of wafers cut in a direction orthogonal to the cross-sections of the micro devices; for example, the cross-sectional views of the wafers cut in a direction 300 orthogonal to the plane of the thin film magnetic head 291 to be the air bearing surface 200. FIG. 5C, FIG. 6C . . . FIG. 15C, FIG. 17C, FIG. 18C . . . FIG. 20C are top plan views of micro devices; for example, top plan views of wafers of the thin film magnetic head 291.

First, as illustrated in FIG. 5A, FIG. 5B, and FIG. 5C, a first thin film 20 is formed on a substrate 40. The first thin film 20 is deposited by, for example, sputtering. Note, the substrate means not only a substrate itself but also a substrate on which a predetermined under layer for configuring a thin film and a micro device is formed. For the purpose of manufacturing the thin film magnetic head as a micro device, the substrate 40 can be replaced with the lower shield layer 40 and the first thin film 20 can be replaced with a lamination film 20 of which electrical resistance changes according to an external magnetic field. As one example, the lamination film 20 includes a lower magnetic layer of which a magnetization direction is pinned with respect to the external magnetic field, a nonmagnetic intermediate layer, and an upper magnetic layer of which a magnetization direction changes according to the external magnetic field; the electrical resistance changes according to the external magnetic field. In the following description, "substrate" may be alternatively referred to as "lower shield layer," and "first thin film" may be alternatively referred to as "lamination film."

Next, a mask for patterning the above-described first thin film 20 is made (see also FIG. 3). First, as illustrated in FIG. 6A, FIG. 6B, and FIG. 6C, above the substrate 40 on which the first thin film 20 is formed, an inorganic material 62 that is resolvable into alkali solution is formed (S1). The inorganic material 62 can be formed by, for example, a low temperature atomic layer vapor deposition method or a high temperature atomic layer vapor deposition method. The inorganic material 62 can be formed of an inorganic oxide selected from $Al_2O_3$, ZnO, SnO, $SnO_2$, PbO, $PbO_2$, $Pb_3O_4$, MgO, $Nb_2O_5$, $Ta_2O_5$, $TiO_2$, and $WO_3$, or a combination of two or more of these.

Figure 4:
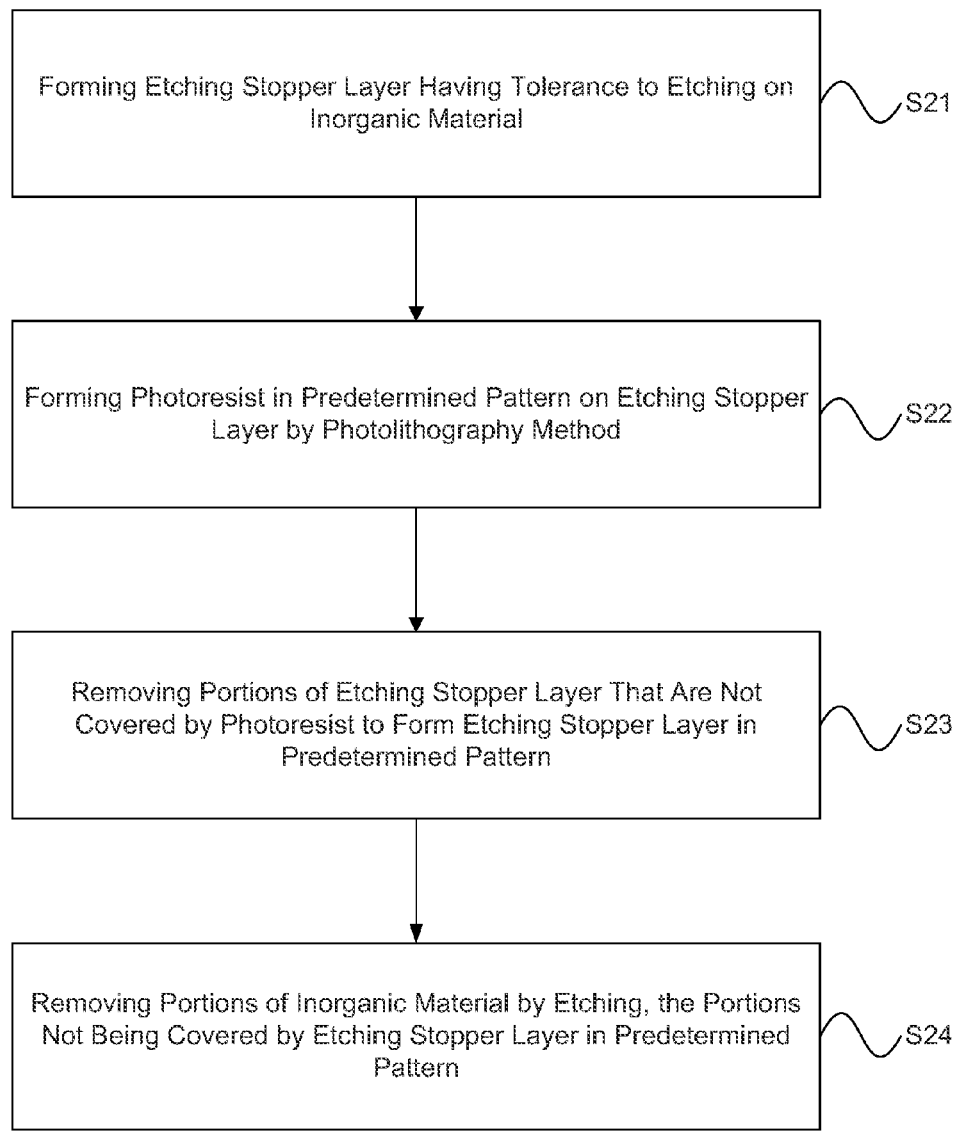
FIG. 4 is a flow diagram illustrating one example of a detail process of S2 illustrated in FIG. 3.

Next, the inorganic material 62 is formed in a predetermined pattern (S2). One preferred example of the method of forming the inorganic material 62 in the predetermined pattern is illustrated in the flow diagram of FIG. 4.

Figure 7A:
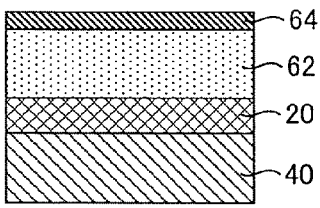
Figure 7B:
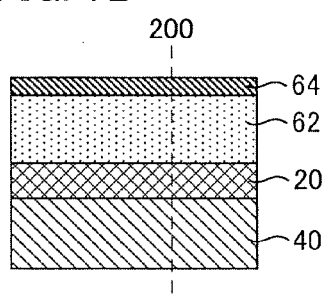
Figure 7C:
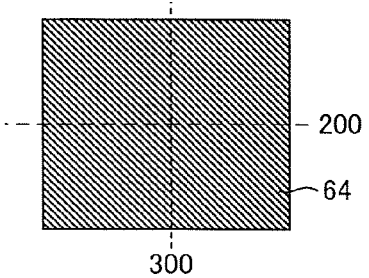

Specifically, as illustrated in FIG. 7A, FIG. 7B, and FIG. 7C, an etching stopper layer 64 is first formed on the inorganic material 62 (S21). The etching stopper layer 64 is formed of a material having an etching tolerance for etching the inorganic material 62 thereafter.

Figure 8A:
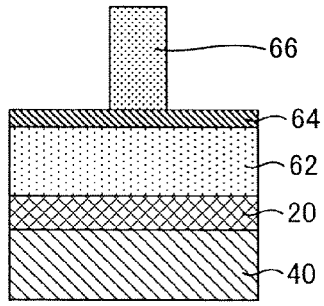
Figure 8B:
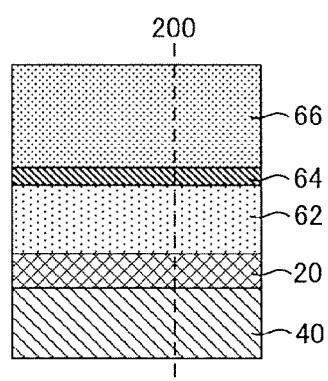
Figure 8C:
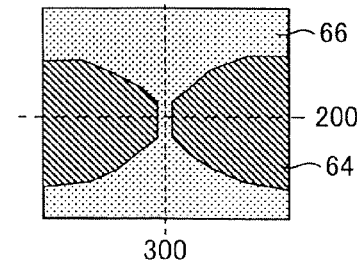

Next, as illustrated sin FIG. 8A, FIG. 8B, and FIG. 8C, a photoresist 66 in a predetermined pattern is formed on the etching stopper layer 64 by, for example, a photolithography method (S22). The photoresist 66 can be either a positive resist or a negative resist. Also, the photoresist 66 can be either a monolayer type or a bilayer type.

Figure 9A:
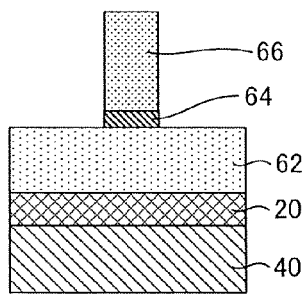
Figure 9B:
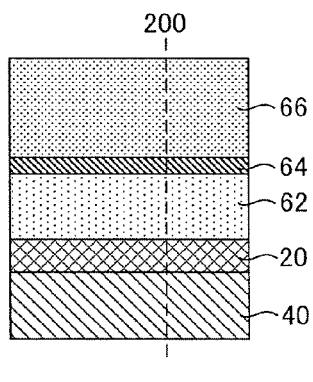
Figure 9C:
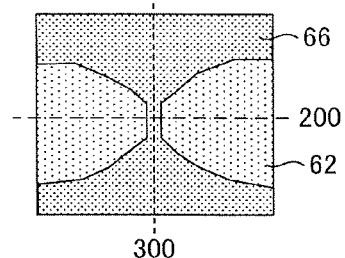

Next, as illustrated in FIG. 9A, FIG. 9B, and FIG. 9C, portions of the etching stopper layer 64 that are not covered by the photoresist 66 are removed to form the etching stopper layer 64 in a predetermined pattern (S23). The etching stopper layer 64 is formed in a pattern corresponding to the pattern of the photoresist 66. The etching stopper layer 64 can be removed by, for example, milling.

Figure 10A:
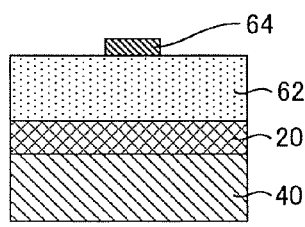
Figure 10B:
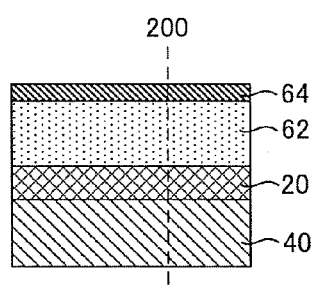
Figure 10C:
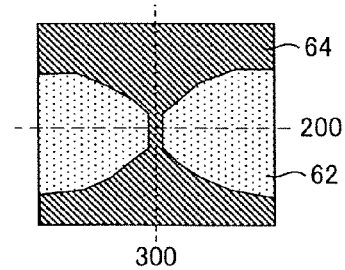

Next, as illustrated in FIG. 10A, FIG. 10B, and FIG. 10C, the photoresist 66 on the etching stopper layer 64 is removed if needed. The photoresist 66 can be removed by a lift-off method. Not only in this step, removal of the photoresist 66 can be performed in a proper step. Specifically, the removal of the photoresist 66 can be performed preferably before a patterning of the first thin film 20, which will be described later, and more preferably can be performed before a narrowing of the inorganic material 62.

Figure 11A:
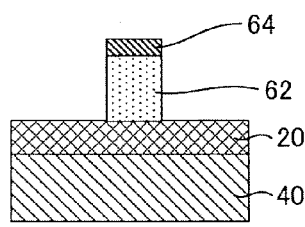
Figure 11B:
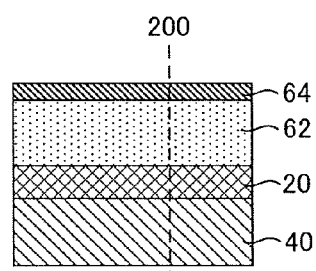
Figure 11C:
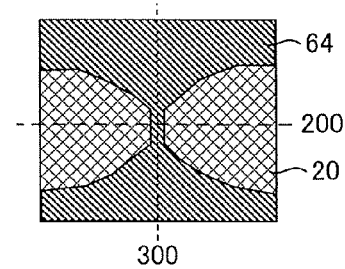

Next, as illustrated in FIG. 11A, FIG. 11B, and FIG. 11C, portions of the inorganic material 62 that are not covered by the etching stopper layer 64 are removed by etching (S24). The inorganic material 62 can be removed by, for example, reactive ion etching. In this case, it is preferable that the etching stopper layer 64 is formed of a material having a tolerance to the reactive ion etching. As one example, the etching stopper layer 64 can be formed of Ni and/or NiFe.

Figure 12A:
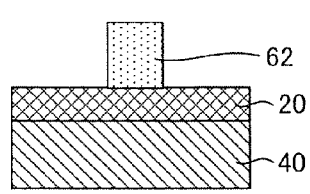
Figure 12B:
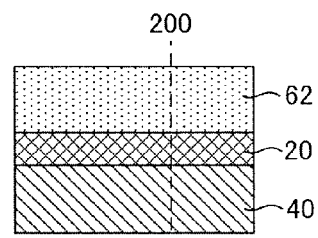
Figure 12C:
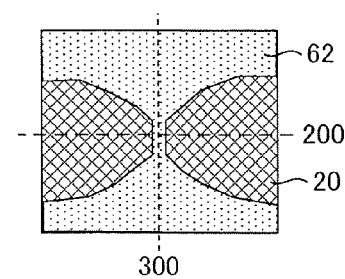

It is preferred to remove the etching stopper layer 64 after the portions of the inorganic material 62 that are not covered by the etching stopper layer 64 in the predetermined pattern are removed by etching and before S3, which is described later, in which the inorganic material 62 is narrowed by alkali solution (see FIG. 12A, FIG. 12B, and FIG. 12C). The etching stopper layer 64 can be removed by etching using, for example, $FeCl_2$. It is also possible to remove the etching stopper layer 64 together with the mask made from the inorganic material 62 after completing the patterning of the first thin film 20. Description regarding removal of the mask will be given later.

Figure 13A:
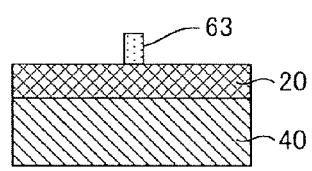
Figure 13B:
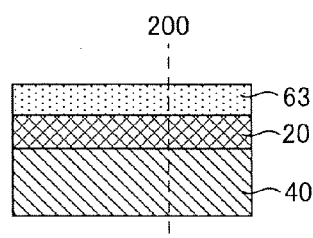
Figure 13C:
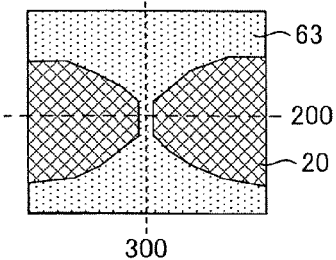

Then, as illustrated in FIG. 13A, FIG. 13B, and FIG. 13C, the inorganic material 62 in the predetermined pattern is narrowed by the alkali solution to form a mask 63 (S3). Any material of alkali solution such as an inorganic developer, an organic developer, or the like, can be used as long as it can narrow the inorganic material 62. For example, as the alkali solution, tetramethylammonium hydroxide (TMAH) solution can be used.

For the purpose of adjusting the size of the inorganic material 62, the alkali solution is preferably solution with a low etching rate, which is, for example, solution with a relatively low concentration. The mask 63, which is narrowed as described above, can be used as a mask for patterning the first thin film 20. The inorganic material configuring the mask 63 normally has a higher strength than an organic material, so there is an advantage that stability of the inorganic material that has been used as the mask after being narrowed is high. As a result, it can prevent the mask 63 from leaning or toppling.

Also, because the mask 63 is formed by narrowing the inorganic material 62 using the alkali solution but not by ashing using gas, it is possible to suppress that the width and shape of the mask 63 varies between the central portion of the wafer and an outer circumference of the wafer even when a large number of the first thin films 20 on the wafer are patterned at one time. As a result, variation of the shape of a thin film and a micro device that are patterned using this mask 63 is suppressed.

With the etching stopper layer 64 remaining on the inorganic material 62, it is possible to prevent a decrease of the height of the inorganic material 62 during the process of narrowing the inorganic material 62. In this case, there is an advantage that a sufficient thickness for using the mask 63 is more likely to be maintained.

Next, description is given regarding a method of patterning the first thin film 20 using the mask 63 that has been narrowed as described above. Next, as illustrated in FIG. 14A, FIG. 14B, and FIG. 14C, portions of the first thin film 20 that are not covered by the mask 63 are removed. Thereby, the first thin film 20 on the substrate 40 can be patterned in a predetermined shape. Herein, both sides of the first thin film 20 in the track width direction T are removed. As a result, the width of the first thin film 20, which is, for example, a MR element, in the track width direction T can be partially narrowed. During this, the first thin film 20 is attached around the mask 63 (hereinafter, referred to as "first thin film 20a").

Removal of the first thin film 20 can be performed by, for example, ion beam milling. In this case, it is preferred that the mask 63 is formed of a material, which is, for example, alumina ($Al_2O_3$), that is less likely to be trimmed by the ion beam milling Next, as illustrated in FIG. 15A, FIG. 15B, and FIG. 15C, the insulating layer 80 and the magnetic layer 82 (may be collectively referred to as "second thin film (80 and 82)") are formed in the portions where the first thin film 20 has been removed. Note, at this point, also around the first thin film 20a that is attached to the mask 63, the second thin film (80 and 82) (hereinafter, referred to as "second thin film (80a and 82a)") are attached (hereinafter, "the first thin film 20a" that is attached to the mask 63 and "the second thin film (80a and 82a)" are collectively referred to as "attachments 20a, 80a, and 82a to the mask"). For manufacture of micro devices other than the MR element 20 illustrated in FIG. 2, materials for the first thin film 20 and the second thin film (80 and 82) can be arbitrarily selected based on a configuration.

Next, in order to form the first thin film 20 in a predetermined pattern, the mask 63 is removed. It is preferred to remove the mask 63 by alkali solution. Description is given regarding a preferred process for removing the mask 63 with reference to the flow diagram of FIG. 16, and FIGS. 17A, 17B, and 17C-FIGS. 20A, 20B, and 20C.

First, as illustrated in FIG. 17A, FIG. 17B, and FIG. 17C, after forming the second thin film (80 and 82), the second thin film (80 and 82) are covered by a resist 68 to expose at least portions of the second thin film (80a and 82a) (S4). It is preferred that the resist 68 is made of a material having a tolerance to milling in S5 and alkali solution.

Figure 18B:
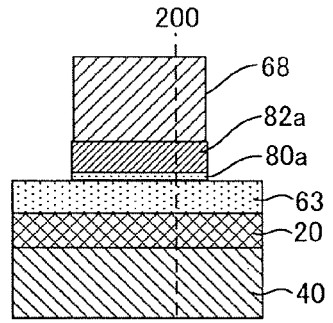
Figure 18C:
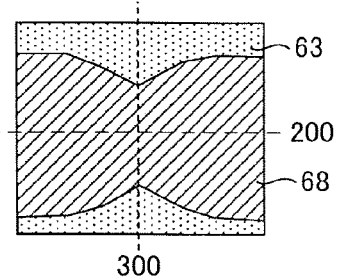

Next, as illustrated in FIG. 18A, FIG. 18B, and FIG. 18C, the second thin film (80a and 82a) on the mask 63 that are exposed from the resist 68 are removed to expose portions of the mask 63 (S5). Removal of the second thin film (80a and 82a) can be performed by milling.

Figure 19A:
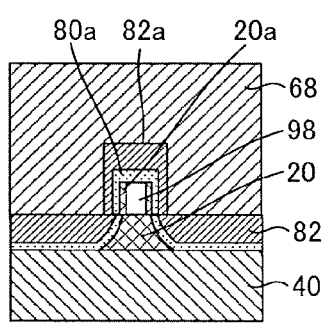
Figure 19B:
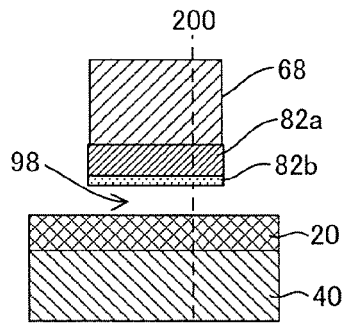
Figure 19C:
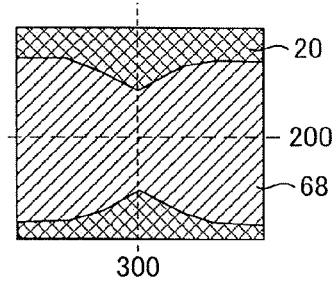

Next, as illustrated in FIG. 19A, FIG. 19B, and FIG. 19C, the mask 63 is removed by alkali solution to form a space 98 between the first thin film 20 and the resist 68 (S6). The mask 63 is removed by the alkali solution so that the mask 63 existing in the narrow space 98 as illustrated in FIG. 19A and FIG. 19B can be removed. In the present step, in order to totally remove the mask 63, it is preferred to use alkali solution with a fast etching rate.

Next, as illustrated in FIG. 20A, FIG. 20B, and FIG. 20C, the attachments 20a, 80a, and 82a to the mask that are attached to the resist 68 are removed together with the resist 68 (S7). Removal of the resist 68 can be performed by, for example, a lift-off method. As described above, forming the space 98 between the first thin film 20 and the resist 68 enables easy removal of the resist 68 and the attachments 20a, 80a, and 82a to mask that are attached to the resist 68.

Thereafter, in the case of manufacturing the thin film magnetic head 291, the upper shield layer 50 is formed by, for example, a plating method on the first thin film (MR element) 20 and the second thin film (80 and 82). As a result, the reading element 10 illustrated in FIG. 2 is formed.

For manufacturing the thin film magnetic head 291 illustrated in FIG. 1, the writing element 293 is formed on the above-described reading element 10. Then, a wafer on which the reading element 10 and the writing element 293 are formed is divided into bars, and an air bearing surface 200 is exposed by polishing. Furthermore, the bar is divided into sliders, processes such as washing, examination or the like are performed, and then a slider is completed (see also FIG. 29).

Next, regarding a preferred second embodiment of a method of making a mask of the present invention, a method of patterning a thin film, and a method of manufacturing a micro device, description is given using a method of manufacturing a MR element or the like used for the thin film magnetic head as an example. FIGS. 21A, 21B, and 21C-FIGS. 27A, 27B, and 27C illustrate a series of steps of patterning a thin film for forming a MR element or the like for a micro device such as a thin film magnetic head or the like. Out of these figures, FIGS. 21A, 21B, and 21C-FIGS. 24A, 24B, and 24C illustrate the method of making the mask according to the second embodiment. FIGS. 25A, 25B, and 25C-FIGS. 27A, 27B, and 27C illustrate a method of patterning a thin film using the mask.

Figure 21A:
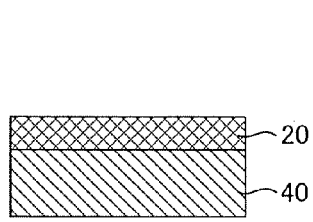
Figure 21B:
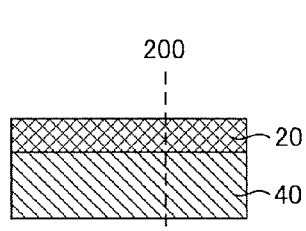
Figure 21C:
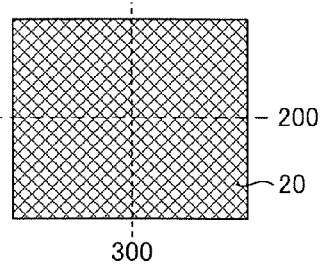
Figure 22A:
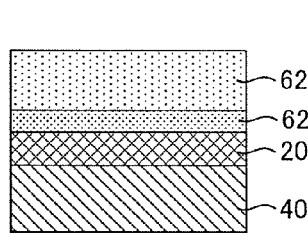
Figure 22B:
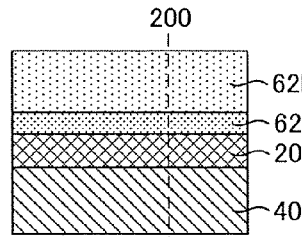
Figure 22C:
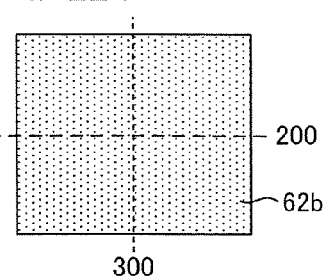
Figure 27A:
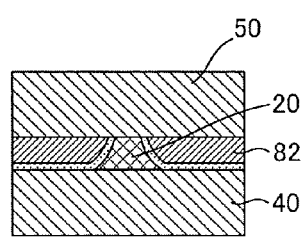
FIGS. 27A, 27B, and 27C are process drawings illustrating a method of manufacturing a reading element using the mask made by the method according to the second embodiment.
Figure 27B:
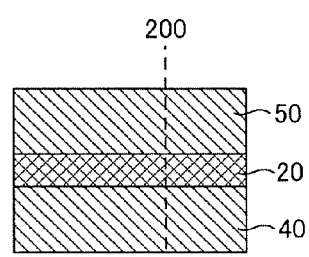
Figure 27C:
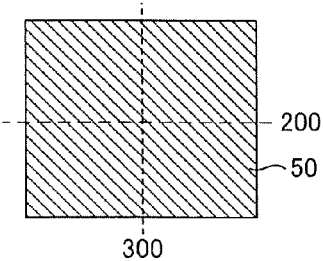

Note, FIG. 21A, FIG. 22A ... FIG. 27A are cross-sectional views of micro devices; for example, cross-sectional views of wafers along a plane of the thin film magnetic head 291 that is to be the air bearing surface 200. FIG. 21B, FIG. 22B ... FIG. 27B are cross-sectional views cut in a direction orthogonal to the cross-sections of the micro devices; for example, the cross-sectional views of the wafers cut in the direction 300 orthogonal to the plane of the above-described thin film magnetic head 291 to be the air bearing surface 200. FIG. 21C, FIG. 22C ... FIG. 27C are top plan views of the micro devices; for example, top plan views of the wafers of the thin film magnetic head 291.

First, as illustrated in FIG. 21A, FIG. 21B, and FIG. 21C, the first thin film 20 is formed on the substrate 40 in a similar way to the first embodiment. The first thin film 20 is deposited by, for example, sputtering. Note, the substrate means not only a substrate itself but also a substrate on which a predetermined under layer for configuring a thin film and a micro device is formed. For the purpose of manufacturing the thin film magnetic head as a micro device, the substrate 40 can be replaced with the lower shield layer 40 and the first thin film 20 can be replaced with a lamination film 20 of which electrical resistance changes according to an external magnetic field. As one example, the lamination film 20 includes a lower magnetic layer of which a magnetization direction is pinned with respect to the external magnetic field, a nonmagnetic intermediate layer; an upper magnetic layer of which a magnetization direction changes according to the external magnetic field, and the electrical resistance changes according to the external magnetic field. In the following description, "substrate" may be alternatively referred to as "lower shield layer", and "first thin film" may be alternatively referred to as "lamination film."

Next, a mask for patterning the above-described first thin film 20 is made. First, as illustrated in FIG. 22A, FIG. 22B, and FIG. 22C, above the substrate 40 on which the first thin film 20 is formed, inorganic materials 62a and 62b which are resolvable into alkali solution are formed (S1). Herein, in the present embodiment, the inorganic materials are formed in the following order: a first inorganic material 62a of which an etching rate to the alkali solution is relatively fast and a second inorganic material 62b of which an etching rate to the alkali solution is relatively slow.

The first inorganic material 62a and the second inorganic material 62b each can be formed of an inorganic oxide selected from, for example, $Al_2O_3$, ZnO, SnO, $SnO_2$, PbO, $PbO_2$, $Pb_3O_4$, MgO, $Nb_2O_5$, $Ta_2O_5$, $TiO_2$, and $WO_3$, or a combination of two or more of these. The etching rates of the first and second inorganic materials 62a and 62b can be adjusted by selection of materials and a method of forming an inorganic material. For example, the first inorganic material 62a and the second inorganic material 62b are formed of $Al_2O_3$, the first inorganic material 62a is formed by a low temperature atomic layer vapor deposition method, and the second inorganic material 62b is formed by a high temperature atomic layer vapor deposition method. Thereby, the first inorganic material 62a has a different density from the second inorganic material 62b so that the etching rate varies.

Figure 23A:
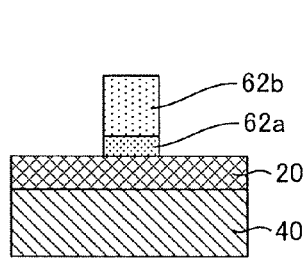
Figure 23B:
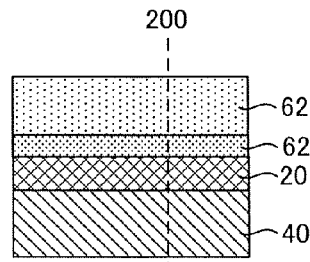
Figure 23C:
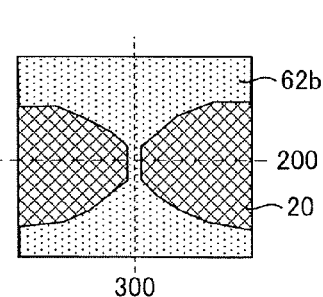

Next, the first inorganic material 62a and the second inorganic material 62b are formed in a predetermined pattern (S2). The present step S2 can be performed in a similar way to the first embodiment (see also FIG. 4 and FIGS. 7A, 7B, and 7C-FIGS. 12A, 12B, and 12C). Here, detail description of the present step S2 is omitted. After completing the present step, the first inorganic material 62a and the second inorganic material 62b in the predetermined pattern illustrated in FIGS. 23A, 23B, and 23C are formed.

Figure 24A:
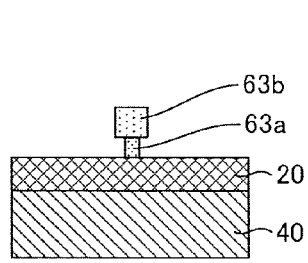
Figure 24B:
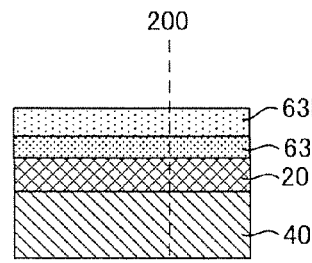
Figure 24C:
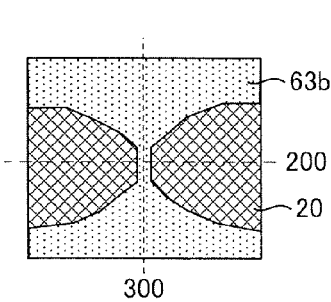

Next, as illustrated in FIG. 24A, FIG. 24B, and FIG. 24C, the first inorganic material 62a and the second inorganic material 62b are narrowed by alkali solution to form masks 63a and 63b (S3). Any material of alkali solution can be used as long as it can narrow the first inorganic material 62a and the second inorganic material 62b.

Here, the first inorganic material 62a is narrower than the second inorganic material 62b because the etching rate of the first inorganic material 62a is faster than the second inorganic material 62b. Therefore, the entire of the masks 63a and 63b are formed in substantially T-shape. As described above, the T-shaped masks 63a and 63b can be used as masks for patterning the first thin film 20. In this case, because the mask 63a is smaller than the mask 63b, there is an advantage that it becomes difficult for the masks 63a and 63b to couple to the first thin film 20 so that the removal becomes easier.

Figure 25A:
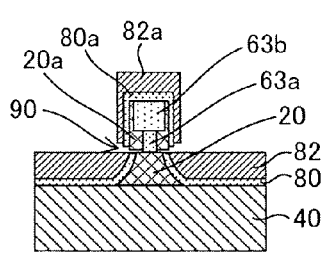
Figure 25B:
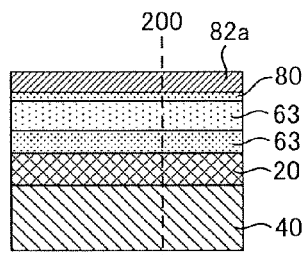
Figure 25C:
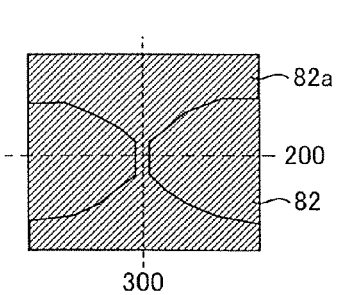

Next, in a similar way to the first embodiment, portions of the first thin film 20 that are not covered by the masks 63a and 63b are removed as illustrated in FIG. 25A, FIG. 25B, and FIG. 25C. During this, the first thin film 20 (hereinafter, referred to as "first thin film 20a") is attached around the masks 63a and 63b. Then, the insulating layer 80 and the magnetic layer 82, which are as the second thin film, are formed at the portions where the first thin film 20 has been removed.

At this point, also around the first thin film 20a that is attached to the masks 63a and 63b, the second thin film (80 and 82) (hereinafter, referred to as "second thin film 80a and 82b") are attached. Herein, in the present embodiment, because the mask 63a is smaller than the mask 63b, there is an advantage that it becomes difficult for the first thin film 20a and the second thin film (80a and 82a) (hereinafter, "the first thin film 20a" and "the second thin film (80a and 82a)" are collectively referred to as "attachments 20a, 80a, and 82a to the masks") formed on the masks 63a and 63b to couple to the second thin film (80 and 82) deposited on the both sides of the first thin film (MR element) 20.

Figure 26A:
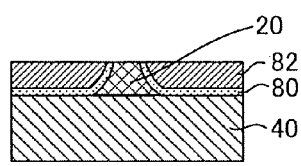
Figure 26B:
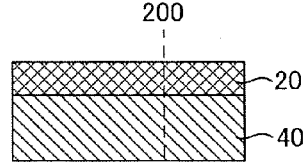
Figure 26C:
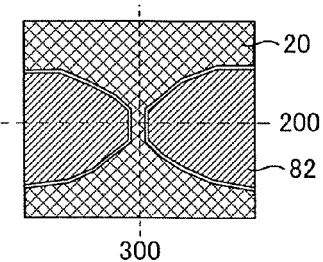

Next, as illustrated in FIG. 26A, FIG. 26B, and FIG. 26C, the masks 63a and 63b are removed by, for example, a lift-off method, and then the attachments 20a, 80a, and 82a to the masks are removed. The masks 63a and 63b and the attachments 20a, 80a, and 82a to the masks can be removed following the flow diagram illustrated in FIG. 16 in a similar way to the first embodiment. As described above, because the coupling force between the attachments 20a, 80a, and 82a to the mask and the second thin film (80 and 82) on the substrate 40 is small, it enables easy removal of the attachments 20a, 80a, and 82a to the masks.

Thereafter, as illustrated in FIG. 27A, FIG. 27B, and FIG. 27C, the upper shield layer 50 is formed on the magnetic layers 82 and the first thin film (MR element) 20 by, for example, a plating method. As a result, the reading element 10 illustrated in FIG. 2 is formed.

In order to manufacture the thin film magnetic head 291 illustrated in FIG. 1, as described in the first embodiment, only a forming the writing element 293 on the above-described reading element 10 is a requirement.

Figure 28:
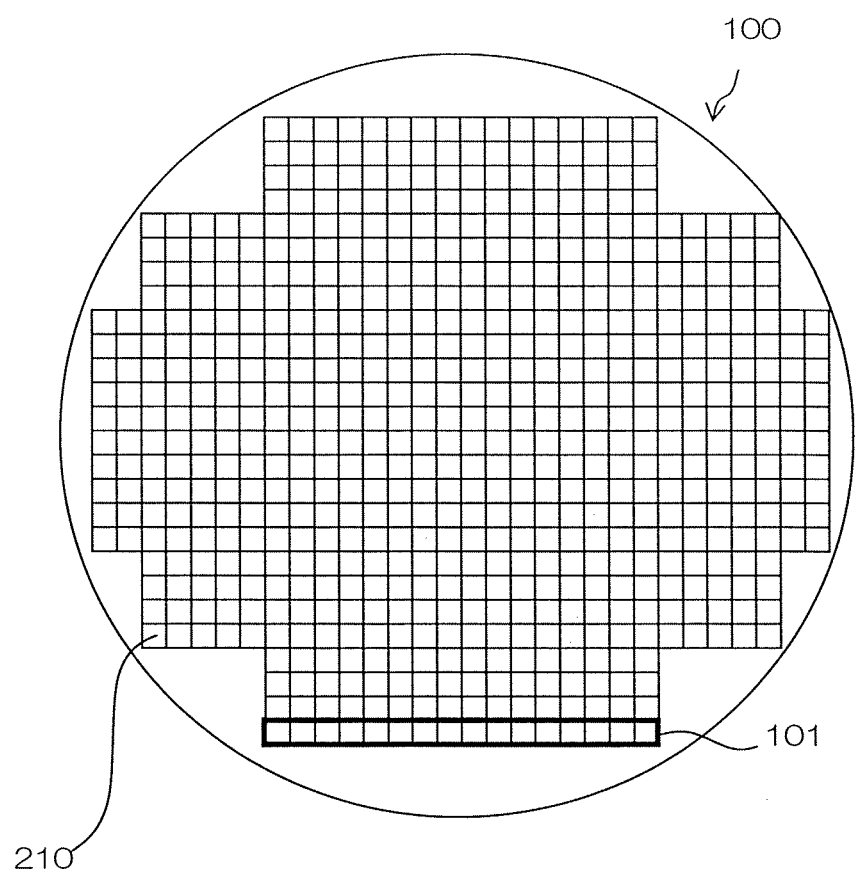
FIG. 28 is a plan view of a wafer related to manufacture of a magneto resistive effect element of the present invention.

Next, description is given regarding a wafer that is used for manufacturing the above-described thin film magnetic head 291. Referring to FIG. 28, at least the above-described thin film magnetic heads are formed on a wafer 100. The wafer 100 is divided into a plurality of bars 101 that are an operational unit for performing a polishing process onto the air bearing surface. The bar 101 is further cut after the polishing process and is separated into sliders 210 each including the thin film magnetic head 291. In the wafer 100, a cut margin (not illustrated) for cutting the wafer 100 into the bar 101 and the bar 101 into the slider 210 is disposed.

Figure 29:
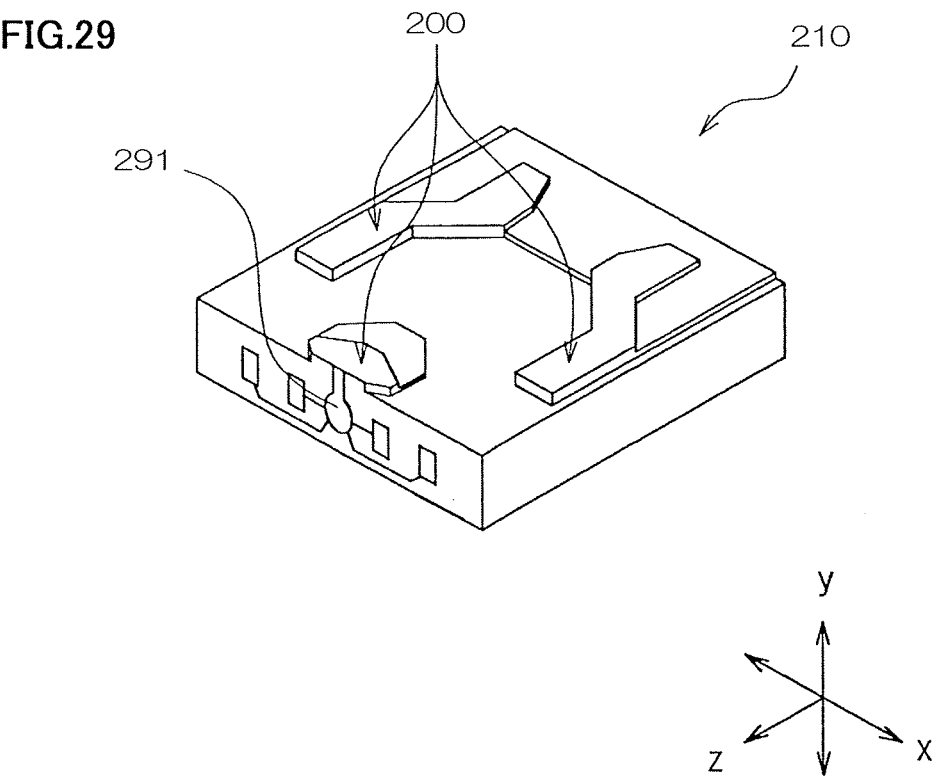
FIG. 29 is a perspective view of a slider of the present invention.

Referring to FIG. 29, a slider 210 has a substantially hexahedral shape, and one surface of the six outer surfaces is the air bearing surface 200 that opposes a recording medium such as, for example, a hard disk. In the figures, the x-direction corresponds to the above-described track width direction T, the z-direction corresponds to the above-described film surface orthogonal direction P, and the y-direction corresponds to a direction orthogonal to the x-direction and the z-direction.

Figure 30:
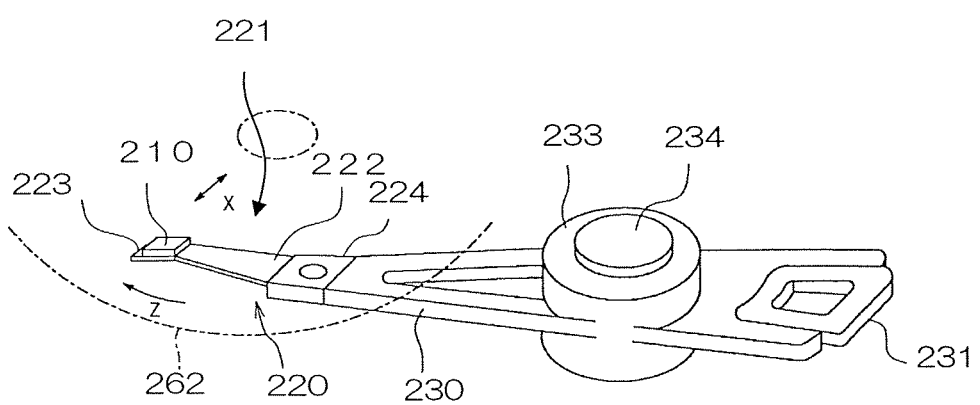
FIG. 30 is a perspective view of a head arm assembly including a head gimbal assembly in which the slider of the present invention is incorporated.

Referring to FIG. 30, a head gimbal assembly 220 includes the slider 210 and a suspension 221 elastically supporting the slider 210. The suspension 221 includes a load beam 222, a flexure 223 and a base plate 224. The load beam 222 is formed of, for example, stainless steel in a plate spring shape. The flexure 223 is arranged on the load beam 222. The base plate 224 is arranged at the other edge part of the load beam 222. The slider 210 is joined to the flexure 223 to give the slider 210 suitable flexibility. At the part of the flexure 223 to which the slider 210 is attached, a gimbal part is disposed to maintain the slider 210 in an appropriate orientation.

The slider 210 opposes the hard disk 262 which is a disk-shaped recording medium that is rotatably driven. When the hard disk 262 rotates in the z-direction of FIG. 30, air flow passing between the hard disk 262 and the slider 210 generates a downward lifting force in the y-direction to the slider 210. The slider 210 flies above the surface of the hard disk due to the lifting force. In the vicinity of the edge part of the slider 210 (edge part in bottom left of FIG. 29) on the air flow exit side, the thin film magnetic head 291 is formed.

An assembly in which the head gimbal assembly 220 is mounted to an arm 230 is referred to as a head arm assembly. The arm 230 moves the slider 210 in a track width direction x of a hard disk 262. One edge of the arm 230 is attached to the base plate 224. To the other edge of the arm 230, a coil 231 that forms one part of a voice coil motor is attached. A bearing part 233 is disposed in the middle part of the arm 230. The arm 230 is rotatably supported by a shaft 234 attached to the bearing part 233. The arm 230 and the voice coil motor for driving the arm 230 configure an actuator.

Figure 31:
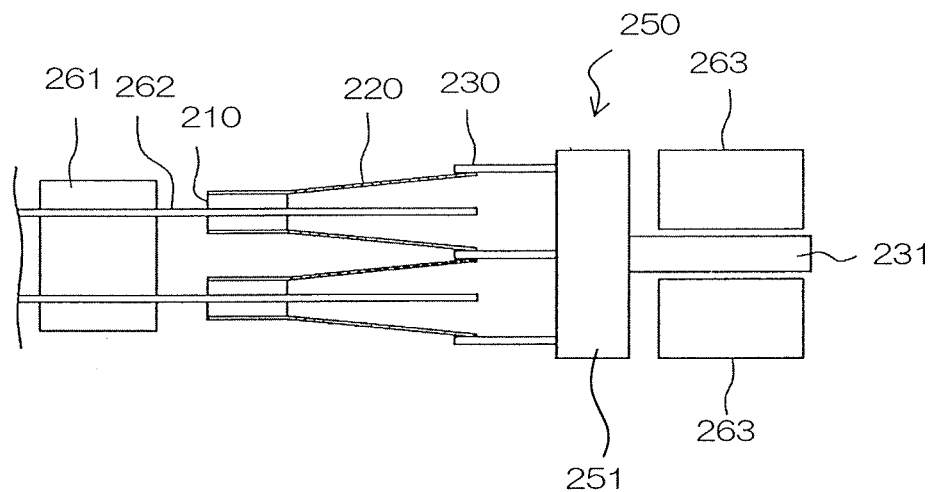
FIG. 31 is a side view of the head arm assembly in which the slider of the present invention is incorporated.
Figure 32:
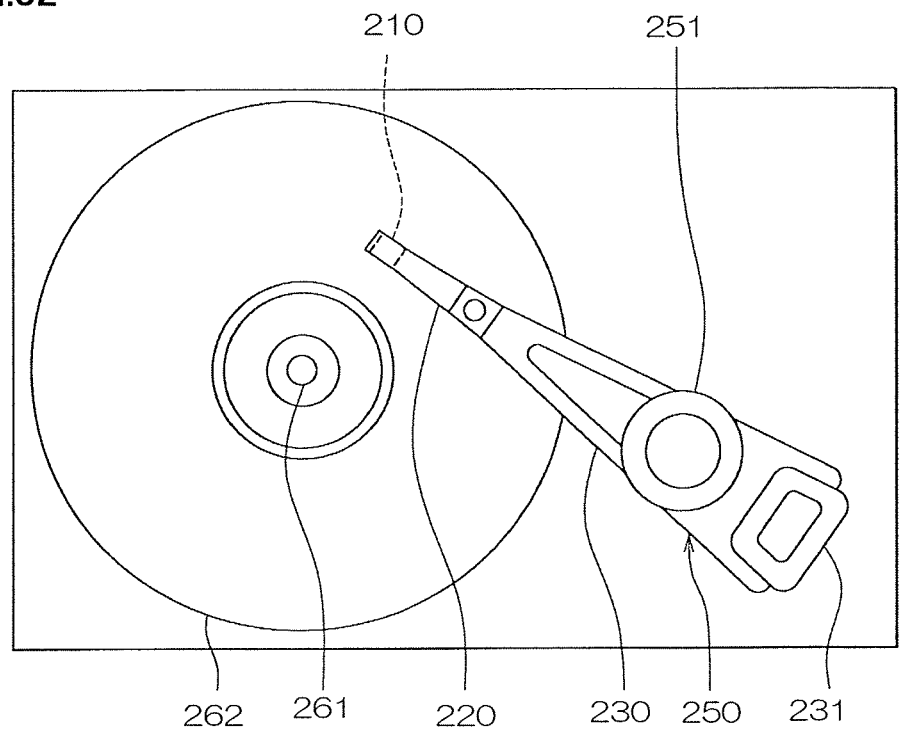
FIG. 32 is a plan view of a hard disk device in which the slider of the present invention is incorporated.

Next, referring to FIG. 31 and FIG. 32, description is given regarding a head stack assembly in which the above-described slider 210 is integrated and the hard disk device. The head stack assembly is an assembly in which the head gimbal assembly 220 is attached to each of the arms 230 of a carriage 251 including a plurality of the arms 230. FIG. 31 is a side view of a head stack assembly. The head stack assembly which is as a positioning device 250 includes a carriage 251 including a plurality of the arms 230. On each of the arms 230, the head gimbal assembly 220 is attached such that the head gimbal assemblies 220 align mutually at an interval in the vertical direction. On the side of the carriage 251, which is the opposite side to the arm 230, a coil 231 is mounted to be a part of the voice coil motor. The voice coil motor includes permanent magnets 263 arranged so as to oppose each other through the coil 231.

Referring to FIG. 32, the head stack assembly 250 is integrated in the hard disk device. The hard disk device includes multiple hard disks 262 attached to a spindle motor 261. For each of the hard disks 262, two sliders 210 are arranged so as to oppose each other sandwiching the hard disk 262. The head stack assembly 250 except for the slider 210 and the actuator correspond to the positioning device, support the slider 210, and also position the slider 210 with respect to the hard disk 262. The slider 210 is moved in the track width direction of the hard disk 262 by the actuator and is positioned with respect to the hard disk 262. The thin film magnetic head 291 included in the slider 210 records information to the hard disk 262 by the writing element, and reproduces information recorded to the hard disk 262 by the reading element.

While preferred embodiments of the present invention have been shown and described in detail, and it is to be understood that variety of changes and modifications may be made without departing from the spirit of scope of the following claims or its scope.

What is claimed is:

1. A method of making a mask for patterning a thin film, comprising:
    a step of forming an inorganic material, which is resolvable into alkali solution, on a substrate;
    a step of forming the inorganic material in a predetermined pattern; and
    a step of narrowing the inorganic material with the alkali solution to form the mask, wherein
    the step of forming the inorganic material in the predetermined pattern includes:
        forming an etching stopper layer having a tolerance to etching on the inorganic material;
        forming a photoresist in a predetermined pattern on the etching stopper layer by a photolithography method;
        removing a portion of the etching stopper layer that is not covered by the photoresist to form the etching stopper layer in a predetermined pattern; and
        removing a portion of the inorganic material by etching, the portion not being covered by the etching stopper layer in the predetermined pattern.

2. The method of making the mask according to claim 1, wherein
    in the step of forming the inorganic material in the predetermined pattern, the inorganic material is formed in the predetermined pattern by a photolithography method.

3. The method of making the mask according to claim 1, wherein
    the portion of the inorganic material that is not covered by the etching stopper layer in the predetermined pattern is removed by reactive ion etching.

4. The method of making the mask according to claim 3, wherein
    the etching stopper layer is formed of a material having a tolerance to the active ion etching.

5. The method of making the mask according to claim 1, wherein
    the etching stopper layer is formed of Ni and/or NiFe.

6. The method of making the mask according to claim 1, wherein
    after removing the portion of the inorganic material by etching, the portion not being covered by the etching stopper layer in the predetermined pattern, the etching stopper layer is removed before narrowing the inorganic material with the alkali solution.

7. A method of patterning a thin film, comprising:
    a step of making a mask having an inorganic material, which is resolvable into alkali solution, by the method of making the mask according to claim 1 on a substrate on which a first thin film is formed; and
    a step of removing a portion of the first thin film that is not covered by the mask and of patterning the first thin film.

8. A method of manufacturing a micro device, comprising:
    a step of patterning a thin film using the method according to claim 7.

9. A method of manufacturing a thin film magnetic head, comprising the method of patterning the thin film according to claim 7, wherein,
    the first thin film is a lamination film of which electrical resistance changes according to an external magnetic field.

10. A method of making a mask for patterning a thin film, comprising:
    a step of forming an inorganic material, which is resolvable into alkali solution, on a substrate;
    a step of forming the inorganic material in a predetermined pattern; and
    a step of narrowing the inorganic material with the alkali solution to form the mask, wherein
    the inorganic material is formed of an inorganic oxide selected from $Al_2O_3$, $ZnO$, $SnO$, $SnO_2$, $PbO$, $PbO_2$, $Pb_3O_4$, $MgO$, $Nb_2O_5$, $Ta_2O_5$, $TiO_2$, and $WO_3$, or a combination of two or more of these.

11. A method of patterning a thin film, comprising:
    a step of making a mask having an inorganic material, which is resolvable into alkali solution, by the method of making the mask according to claim 10 on a substrate on which a first thin film is formed; and a step of removing a portion of the first thin film that is not covered by the mask and of patterning the first thin film.

12. A method of manufacturing a micro device, comprising:
a step of patterning a thin film using the method according to claim 11.

13. A method of manufacturing a thin film magnetic head, comprising the method of patterning the thin film according to claim 11, wherein,
the first thin film is a lamination film of which electrical resistance changes according to an external magnetic field.

14. A method of making a mask for patterning a thin film, comprising:
a step of forming an inorganic material, which is resolvable into alkali solution, on a substrate;
a step of forming the inorganic material in a predetermined pattern; and
a step of narrowing the inorganic material with the alkali solution to form the mask, wherein
in the step of forming the inorganic material, which is resolvable into the alkali solution, on the substrate, a first inorganic material of which an etching rate to the alkali solution is relatively fast, and a second inorganic material of which an etching rate to the alkali solution is relatively slow are formed in this order.

15. The method of making the mask according to claim 14, wherein
the first inorganic material is formed by a low temperature atomic layer vapor deposition method, and the second inorganic material is formed by a high temperature atomic layer vapor deposition method.

16. A method of patterning a thin film, comprising:
a step of making a mask having an inorganic material, which is resolvable into alkali solution, by the method of making the mask according to claim 14 on a substrate on which a first thin film is formed; and
a step of removing a portion of the first thin film that is not covered by the mask and of patterning the first thin film.

17. A method of manufacturing a micro device, comprising:
a step of patterning a thin film using the method according to claim 16.

18. A method of manufacturing a thin film magnetic head, comprising the method of patterning the thin film according to claim 16, wherein,
the first thin film is a lamination film of which electrical resistance changes according to an external magnetic field.

19. A method of patterning a thin film, comprising:
a step of forming an inorganic material, which is resolvable into alkali solution, on a substrate on which a first thin film is formed;
a step of forming the inorganic material in a predetermined pattern;
a step of narrowing the inorganic material with the alkali solution to form a mask,
a step of removing a portion of the first thin film that is not covered by the mask and of patterning the first thin film; and
a step of forming a second thin film on a portion of the substrate where the first thin film is removed and on the mask after the step of patterning the first thin film.

20. The method of patterning the thin film according to claim 19, wherein
after patterning the first thin film, the mask is removed by alkali solution.

21. The method of patterning the thin film according to claim 19, further comprising:
a step of covering the second thin film formed on the substrate with a resist, after forming the second thin film, such that at least a portion of the second thin film formed on the mask is exposed;
a step of removing a portion of the second thin film that is formed on the mask and that is exposed from the resist to expose a portion of the mask;
a step of removing the mask with alkali solution to form a space between the first thin film and the resist; and
a step of removing the second thin film formed on the mask and attached to the resist as well as the resist.

22. The method of patterning the thin film according to claim 21, wherein
the step of removing the second thin film attached to the resist includes removal of attachments attached on the mask in the step of patterning the first thin film.

23. A method of manufacturing a micro device, comprising:
a step of patterning a thin film using the method according to claim 19.

24. A method of manufacturing a thin film magnetic head, comprising the method of patterning the thin film according to claim 19, wherein
the first thin film is a lamination film of which electrical resistance changes according to an external magnetic field.

* * * * *